United States Patent [19]

Malcolm

[11] Patent Number: 5,416,903
[45] Date of Patent: May 16, 1995

[54] SYSTEM AND METHOD FOR SUPPORTING MULTILINGUAL TRANSLATIONS OF A WINDOWED USER INTERFACE

[75] Inventor: Jerry W. Malcolm, Austin, Tex.
[73] Assignee: International Business Machines Corporation, Armonk, N.Y.
[21] Appl. No.: 747,168
[22] Filed: Aug. 19, 1991
[51] Int. Cl.$^6$ .......................... G08B 5/22; G06F 3/14; G06F 17/28
[52] U.S. Cl. .......................... 395/155; 364/419.1 G; 364/419.02; 364/419.05; 395/161
[58] Field of Search ............... 395/156, 155, 375, 600, 395/575, 161; 364/222.9, 419, 221, 419.02, 419.05, 419.16; 340/711

[56] References Cited

U.S. PATENT DOCUMENTS

| | | | |
|---|---|---|---|
| 4,484,304 | 11/1984 | Anderson et al. | 395/161 X |
| 4,730,270 | 3/1988 | Okajima et al. | 364/419.02 |
| 4,731,735 | 3/1988 | Borgendale et al. | 395/419.16 X |
| 4,811,240 | 3/1989 | Ballou et al. | 364/518 |
| 4,870,402 | 9/1989 | Deluca et al. | 364/419 X |
| 4,870,610 | 9/1989 | Belfer | 364/900 |
| 4,980,829 | 12/1990 | Okajima et al. | 364/419.05 X |
| 5,091,876 | 2/1992 | Kumano et al. | 364/419.03 |
| 5,127,748 | 7/1992 | Okimoto et al. | 364/419 X |
| 5,136,503 | 8/1992 | Takagi et al. | 364/419.02 |
| 5,136,504 | 8/1992 | Fushimoto | 364/419.02 |
| 5,146,587 | 9/1992 | Francisco | 395/575 X |
| 5,201,042 | 4/1993 | Weisner et al. | 364/419.02 X |
| 5,251,130 | 10/1993 | Andrews et al. | 364/419.03 |

FOREIGN PATENT DOCUMENTS

| | | |
|---|---|---|
| 0408482 | 12/1990 | European Pat. Off. . |
| 9015380 | 12/1990 | WIPO . |

OTHER PUBLICATIONS

IBM TDB, vol. 25, No. 7B, Dec. 1982, pp. 3730–3732, "Incremental Data Base Log Image Copy".
IBM TDB, vol. 28, No. 4, Sep. 1985, pp. 1623–1628, "Method for Creating Annotation Data".
IBM TDB, vol. 23, No. 6, Nov. 1980, p. 2421, "Triply Indexed Zap Log".
IBM TDB, vol. 33, No. 7, Dec. 1990, pp. 434–438, "National Language Enablement Considerations".
IBM TDB, vol. 32, No. 9B, Feb. 1990, pp. 320–322, "Positioning of Nested or Included Object Presentation Spaces and Object Data".
IBM TDB, vol. 29C, No. 4, Sep. 1986, pp. 1450–1451, "Method for Creating and Packaging Menus for the IBM Personal Computer".
IBM TDB, vol. 33, No. 9, Feb. 1991, pp. 450–463, "Implementation of a National Language Support Enabled Unit of Measure Object Class".
IBM TDB, vol. 33, No. 12, May 1991, pp. 304–305, "Unsaved Changes Tool for Object-Oriented Programming Environment".
IBM TDB, vol. 33, No. 5, Oct. 1990, pp. 341–342, "Insert/Extract Dynamic Screens".
Research Disclosure, Jun. 1985, p. 270.
IBM Systems Journal, vol. 28, No. 3, 1989, pp. 479–493, "A Message Management System for Personal Computers", by L. d'Arielli.

*Primary Examiner*—Heather R. Herndon
*Assistant Examiner*—Cliff N. Vo
*Attorney, Agent, or Firm*—Wayne P. Bailey; Robert M. Carwell

[57] ABSTRACT

A system and method for improved user interface screen generation for an application program which supports multilingual users. Dynamic generation of subscreens, or subpanels, which conform to a given country's language requirements is provided. These subscreens support both input and output operations between an application program and user of a data processing system. The system and method further provide improved conveyance of information between the person(s) responsible for the initial user interface screen or panel layout in the initial language, and the person(s) responsible for translating the language specific portion of this screen layout into a subsequent language. Information containing specific comments pertaining to a given field or submenu to be displayed, and its associated text, can be appended to the file containing the text to be displayed. Other information conveyed with the text file can include change log information, which specifies that only a portion of the whole file has been changed, and which portion needs to be translated as a result.

13 Claims, 4 Drawing Sheets

Case 1: US English Language file on a US system

Case 2: German Language file on a German system

FIG. 5

SYSTEM AND METHOD FOR SUPPORTING MULTILINGUAL TRANSLATIONS OF A WINDOWED USER INTERFACE

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

RELATED PATENT APPLICATIONS

This patent application is related to patent application Ser. No. 07/747,167, filed Aug. 19, 1991, entitled "Computer System for Dynamically Generating Display Screen Panels providing Interactive Interfaces for Application Program Steps" and hereby incorporated by reference; patent application Ser. No. 07/747,169, now abandoned, filed Aug. 19, 1991, entitled "Creating Multiple Versions of Panels from a Single Panel Definition File" and hereby incorporated by reference; and patent application Ser. No. 07/747,170, now abandoned, filed Aug. 19, 1991, entitled "Automatic Program Documentation" and hereby incorporated by reference.

TECHNICAL FIELD

This invention pertains to data processing systems, and more particularly to a system allowing for dynamic screen or panel generation, on a display system, which easily supports multilingual translations.

BACKGROUND ART

The quest for increasing market share in the data processing industry has resulted in expanding the marketing of traditional national products into an international arena. This has resulted in the need for designing products which can meet be modified, or ported, into this international marketplace. Traditional methods for modifying or porting such code have proved inadequate, and cost thousands, and sometimes millions of dollars in such modification.

The modification procedures used encompass translation of the data processing system application program to the respective target language. Initially, this was accomplished by translation centers going through the source code, and making appropriate modifications to suit that particular country's needs. The program would then be recompiled and linked after such changes had been made, and this new runtime program would be sold in that particular market for the language which was implemented. This procedure was not only time-consuming, but subject to errors. These errors are most notable in a windowing, or panel display system having fixed areas for particular types of information, such as information messages, prompt messages, input fields, status indicators, etc. where the format or style of the windows provides a consistent interface, independent of the specific underlying application (this windowing, or..panel interface has been popularized by the Apple Macintosh computer, and follow on products such as Microsoft's Windows program). It should be reiterated that these panels attempt to provide a consistent user interface, independent to a certain extent from the actual application being used by the end user. However, translation centers and translators generally have no knowledge of these panels, and are rather experts in the literal translation of words in one language to that of another language. As a result, the resultant translations cause the format or style of the screen images to change as text used as part of the display is changed, resulting in inconsistent screen formats and styles. The major underlying problem is that the application program would be closely coupled to the type of interface presented to the user, and any change to the application program in translation was directly reflected in the resultant display presented to the user when the application program was run. Other types of errors resulting from this type of system resulted as the file containing the program logic flow was being edited by a person untrained in programming. This resulted in inadvertent changes possibly being made to the syntax of the application program, which would cause fatal errors when trying to compile, link, or run the resulting code.

This problem has been addressed to a certain extent by trying to separate the programming code instructions from the text portion which is to be displayed to the user of the application program. Two separate files are used to accomplish this separation. The idea here is that a translator would only be modifying the text, or language specific file (text file), and not modifying the file containing the language independent program code logic and controls (program file). This system is not without its own set of problems, however, as even though the code is separated from the text, it is not isolated or independent. This is because the program file still possibly maintains information pertaining to the text to be displayed, such as pointers to the location in memory where the text string is located, and the length of the text string. Many times during translation, if not most of the time, the length of the strings will change when translated. The program file would then have to be modified to reflect the change in string length which resulted from such translation.

Some attempts have been made to eliminate the modification of string length step by coding a 'worst case' value for the strength length, the worst case being the longest string value possible for all languages for which the program will be translated for. However, this approach is not only inefficient, but results in a cluttered, unattractive screen displays for all but the language which is utilizing the worst case values, as the menu layout/architecture would have to be designed using these worst case values.

Further, the prior art has not addressed the use of a single screen definition for use in generating differing language specific fields which are used for either input or output of information between an application program and a user of the application program.

DISCLOSURE OF THE INVENTION

The present invention solves the aforementioned problems by providing a system and method for improved user interface screen generation for an application program which supports multilingual users. Dynamic generation of subscreens, or subwindows/subpanels, which conform to a given country's language requirements is provided. These subwindows support both input and output operations between an application program and user of a data processing system.

The system and method further provide improved conveyance of information between the person(s) responsible for the initial user interface screen or panel layout in the initial language, and the person(s) responsible for translating the language specific portion of this screen layout into a subsequent language. Information containing specific comments pertaining to a given field or submenu to be displayed, and its associated text, can be appended to the file containing the text to be displayed. Such annotated text can direct the translator that a particular text string should not be translated, for example, because it is an acronym not capable of being translated. Other information conveyed with the text file can include change log information, which specifies that only a portion of the whole file has been changed, and which portion needs to be translated as a result.

It is therefore an object of the present invention to provide an improved multilingual user interface environment.

It is a further object of the present invention to provide an improved system for generating application programs in a multilingual windows environment.

It is yet another object of the present invention to provide an system for isolating an application program's input/output requirements from the resultant user interface screen generation.

It is yet another object of the present invention to provide a system for minimizing the amount of translation required in a multilingual windowing system.

BRIEF DESCRIPTION OF THE DRAWING

The foregoing and other objects, aspects and advantages of the invention will be better understood from the following Best Mode for Carrying Out the Invention with reference to the figures listed below, in which.

BEST MODE FOR CARRYING OUT THE INVENTION

Figure 1:
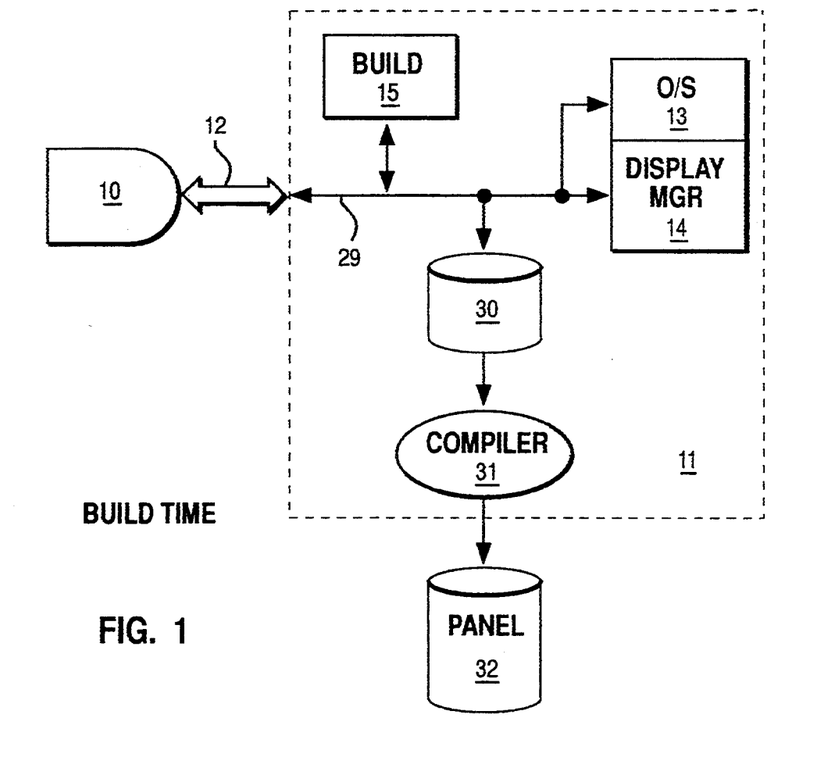
FIG. 1 shows the buildtime operation for creating user I/O interface panels/screens.
Figure 2:
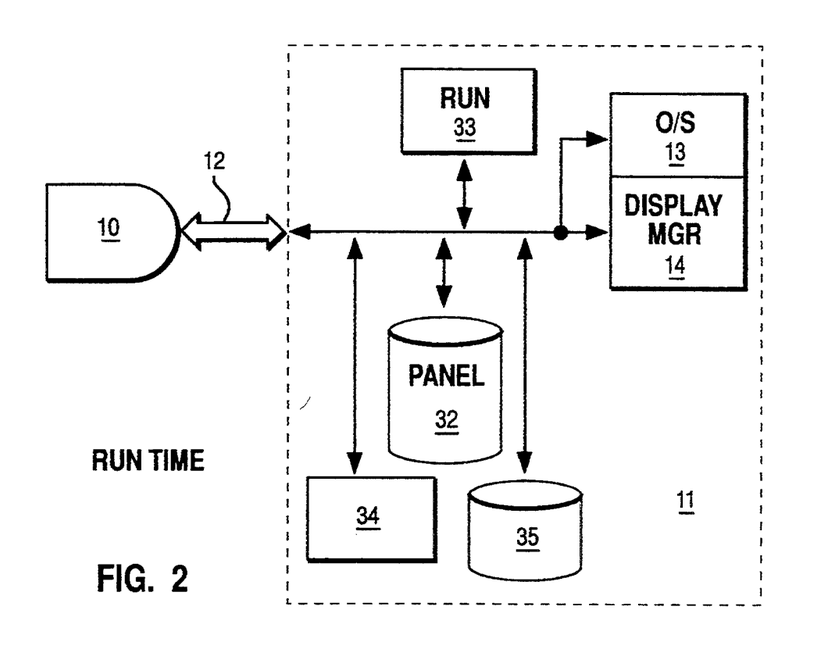
FIG. 2 shows the runtime operation for rendering user I/O interface panels/screens.

The functions of the present invention may be best understood by considering the two high-level functional blocks shown in FIGS. 1 and 2. Referring first to FIG. 1, Build 15 is that part of the overall system when the basic screen panels which are to be used for the I/O interface with the user of a selected application program are developed. FIG. 2's Run 33 is when these basic panels are dynamically modified to provide the final screen panel used for the user I/O during the actual operation of the intended application program running on the data processing system.

Let us now consider how the basic screen panels are developed. With reference to FIG. 1, a typical system for practicing the present invention involves display 10 providing the I/O interface to a panel designer who is going to design a series of panels appropriate to a selected application program. The display screen panels will be called subsequently to provide the I/O to the program user appropriate to each step of the program. The display 10 is functionally interconnected to the processor 11 through I/O bus 12 in the preferred embodiment. For purposes of this description, processor 11 will be considered to be an IBM PS/2 Model 70 which contains an Intel 80386 microprocessor, having an operating system 13 which here is the OS/2 operating system including a display manager 14, e.g. the IBM Presentation Manager. This system is described in greater detail in the IBM publications entitled "ITSC IBM OS/2 Extended Edition", order number GBOF-2195 and "OS/2 PM Application Design", order number GG24-3422, both hereby incorporated by reference as background material. Alternate embodiments could comprise the DOS operating system running Windows[1], or an AIX[2] operating system running AIXwindows[3]. Further, there are numerous other types of processors and operating systems which could implement the herein described invention, without departing from the spirit and scope of the invention being claimed. Through procedures further described in pending patent application Ser. No. 07/747,167, filed Aug. 19, 1991, entitled "Computer System for Dynamically Generating Display Screen Panels providing Interactive Interfaces for Application Program Steps" and hereby incorporated by reference, a source file is generated for each panel created, and stored via internal bus system 29 to file storage means 30. This source code is then compiled through a compiler 31 to create an object code file 32 which defines and describes the panel. The object code file provides the basic panel configurations from which the panels required, when the application program is actually run, to be generated. As will be described in more detail below, this object code file 32 is further broken down into language dependant and independent components. The compiler 31 transforms the high level language source code, which has been used by the panel designer, into an object program file 32 which consists of the machine executable instructions. A reference for compiler design is the text: "Principles of Compiler Design" by Ahao and Ullman published by Addison-Wesley Publishing Company, 1977, and hereby incorporated by reference as background material.

[1]Trademark of Microsoft Corp.
[2]Trademark of IBM Corp.
[3]Trademark of IBM Corp.

Figure 3A:
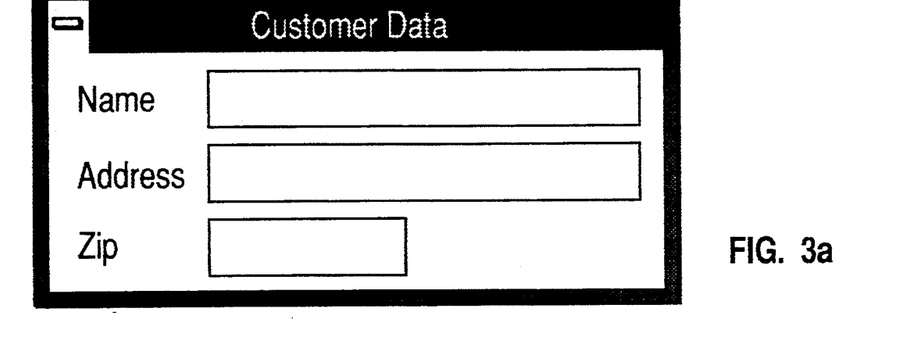
FIGS. 3a-3c are representative samples of various interface panels/screens presented to a user an a display device of a data processing system.
Figure 3B:
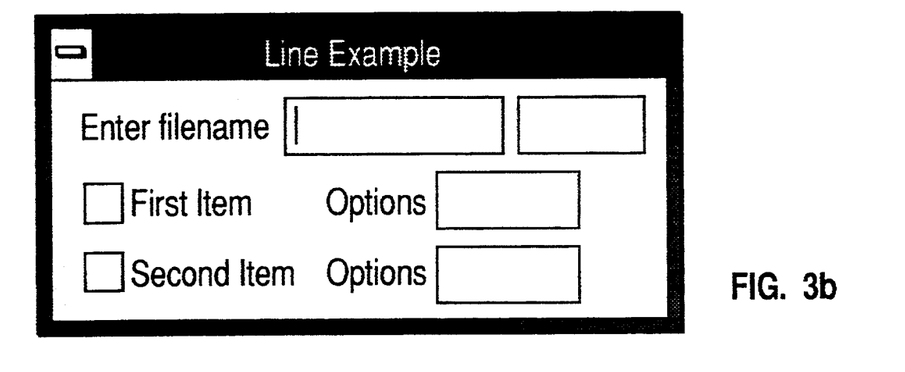
Figure 3C:
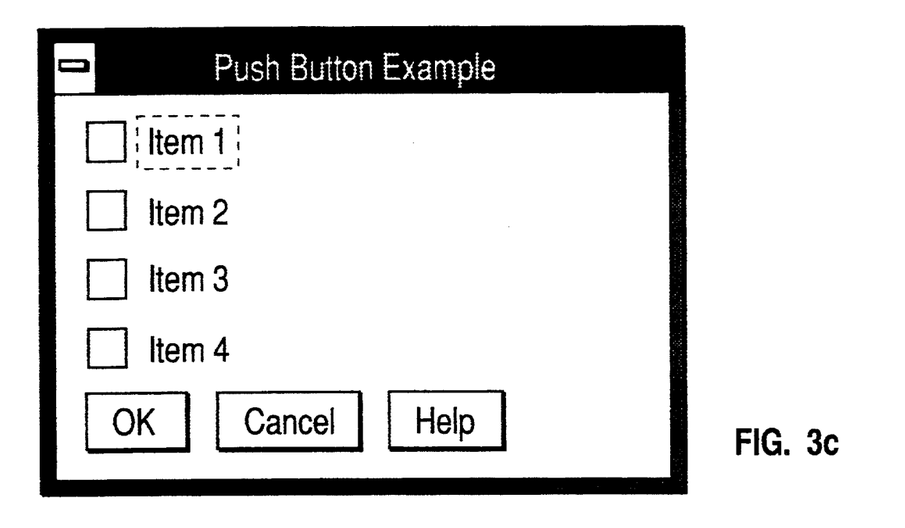

Continuing with the high-level system overview, reference is now made to FIG. 2, where the specific panels created in FIG. 1 are dynamically generated at Runtime, i.e. when the application program is being run and thus requiring and thus requiring the panels for the application program's I/O interface. FIG. 2 shows a processor 11 which for convenience is the same processor of FIG. 1 set up with appropriate components to run the application program 34 and to generate dynamically the requisite screen panel. Display 10 and I/O bus 12 perform their functions as previously described with respect to FIG. 1, as does operating system 13 and display manager 14. The object code file 32 defining the basic screen panels required to support the application program 34, such as shown in FIGS. 3a-3c, are loaded into processor 11 of FIG. 2 during runtime. Also loaded into processor 11 is a set of routines 33, stored in storage means 35, which for convenience of this description will be referred to as the "run" routine for dynamically generating panels to be displayed on screen 10 from the the basic panel data stored in panel file 32. The specifics of this run routine 33 are similarly further described in pending patent application Ser. No. 07/747,167, filed Aug. 19, 1991 entitled "Computer System for Dynamically Generating Display Screen Panels providing Interactive Interfaces for Application Program Steps".

Figure 4:
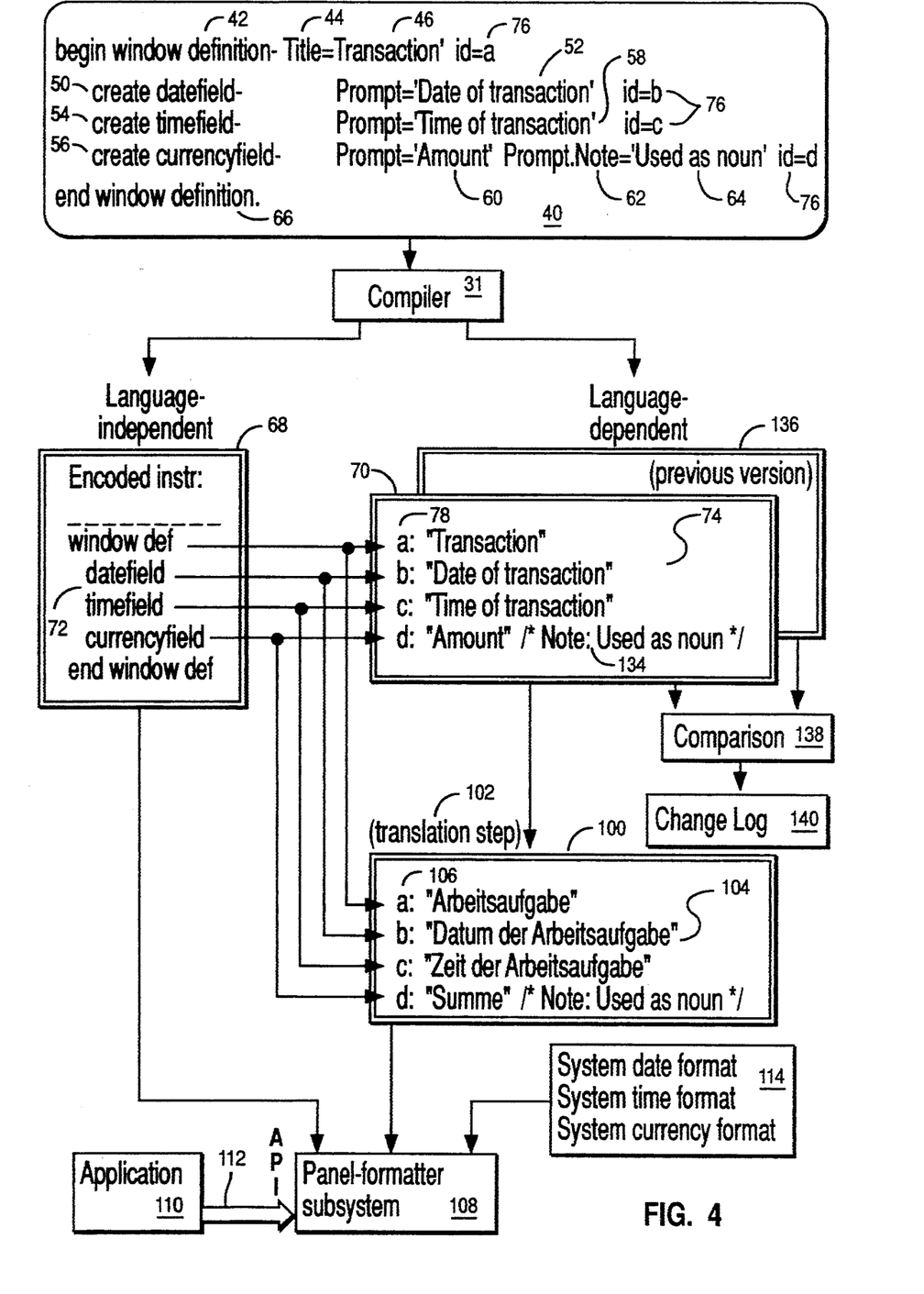
FIG. 4 details the multilingual support capabilities of the system.

Turning now to FIG. 4, the specifics of multilingual translation capabilities will be shown. A single source file 40 is input to the compiler 31. This single source file 40 comprises all information necessary for screen generation and translation of panels such as sample panel 80 of FIG. 5. The single source file 40 contains tagged information for building panels. A begin window definition tag 42 is shown, which defines the title 44 to be displayed in the title text area 45 of FIG. 5 when the particular window is being displayed. In this example, the title text is defined to be 'Transaction' at 46 and ultimately displayed as title text at 48 of FIG. 5.

Figure 5:
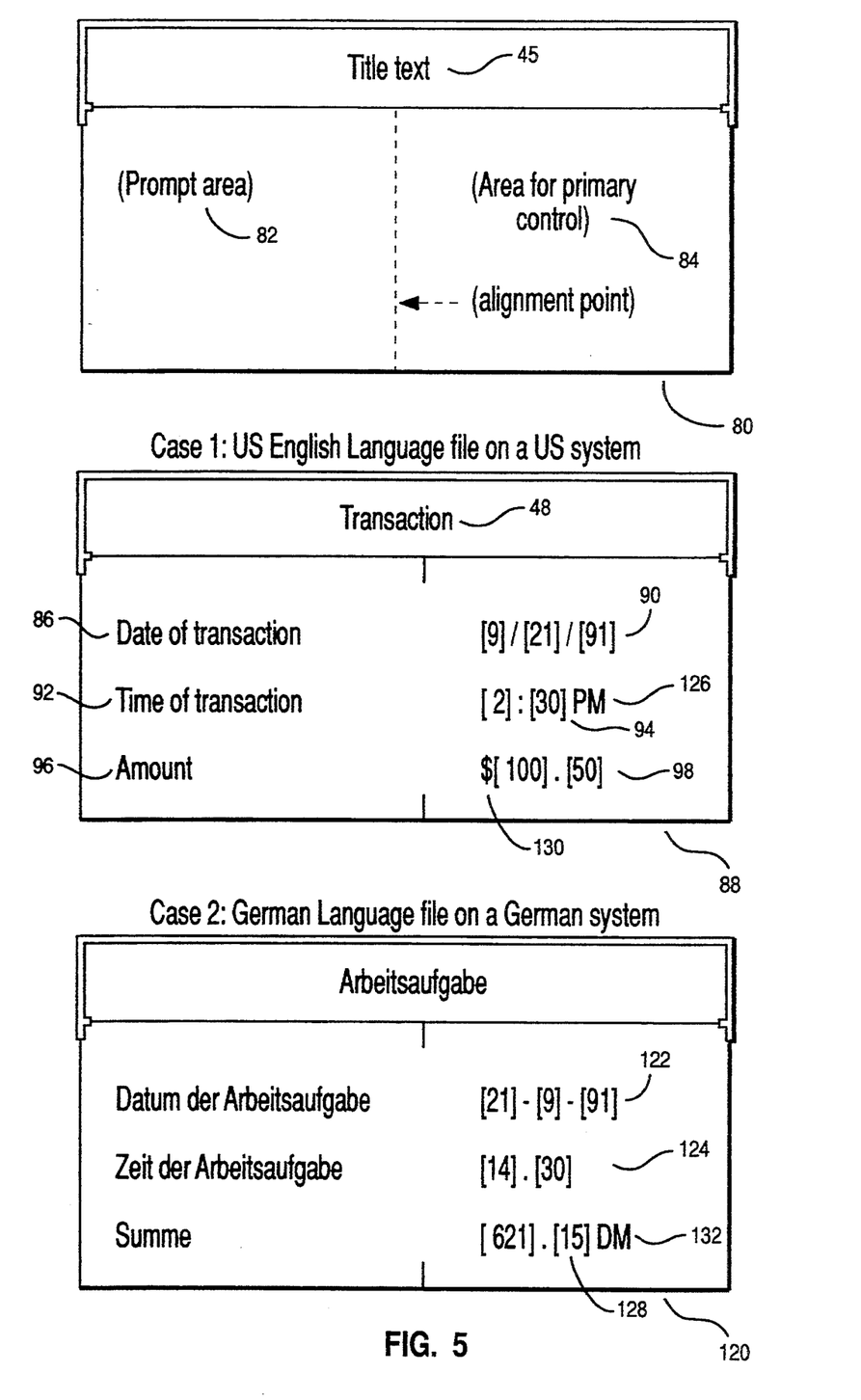
FIG. 5 details the internal areas of a sample panel and resulting panels supporting English and German languages.

Other areas of interest in this sample panel 80 of FIG. 5 are the prompt area 82 and the area for primary control 84. The prompt area 82 will contain information dynamically generated by the system, and is meant to prompt a user to interact with associated subscreen, or primary control areas 84. This control area is the area where user interaction occurs, such as displaying and/or changing system variables or other parameters required by the underlying application program or operating system. For examples a create datefield tag is defined at 50 of FIG. 4, the datefield being known to the system as the field where date information is manipulated. The particular prompt, or text string to be displayed, which is associated with this control field 50 is defined at 52 to be 'Date of transaction'. The prompt fields are displayed in the prompt area 82 as shown in sample panel 80 of FIG. 5. For this particular example, the prompt of 'Date of transaction' would appear at 86 of the English language panel 88 of FIG. 5. This prompt 86 corresponds to subscreen, or control area 90 where a user could confirm, modify, or enter the value for which the user is being prompted for. Other prompt and corresponding control fields are shown for the timefield 54 having a prompt value 58. The subsequent panel display shown in FIG. 5 has the prompt field 92 and associated subscreen 94 of English language panel 88. A final example of prompt and corresponding control fields are shown in FIG. 4 for the currencyfield 56 having a prompt value 60. The subsequent panel display shown in FIG. 5 has the prompt field 96 and associated subpanel 98 of English language panel 88.

The single source file 40 of FIG. 4 has the panel definition terminated by an 'end window definition tag' 66 in the preferred embodiment. The Prompt.Note tag 62 having a text string 64 associated therewith will be discussed later. Other information can be included in this single source file, and only the portions germane to this discussion are shown. Other types of information could include, for example, text which would be included in user documentation or help panels associated with a particular panel or window.

As previously described, the single source file 40 is the input data for a compiler 31. This compiler is designed, using programming techniques known to those of ordinary skill in the art, to segregate language independent and language dependent information, as shown at 68 and 70 of FIG. 4. The language independent information 68 would include system controls and variables which are known to, and accessed by, the data processing system by its own internal methods. Hence, the information is independent of any language being presented on display screens to the user. The language dependent information 70 contains text and/or data which is presented to the user in a particular language which, hopefully, the user understands. Thus, this information is segregated in a file separate from the language independent information, so that only the information requiring translation from one language to another need be conveyed to translators or translation centers. In this particular example of FIG. 4, the language independent file 68 contains system encoded instructions for the window def, datefield, timefield, currency field, and end window def tags. The corresponding prompt text for these tags is maintained in the language dependent file 70, as shown at 74. The method for associating which prompt string goes with which tag is shown at 76 and 78, where an id field 76 is included in the single source file 40 which uniquely defines an id for the tag and corresponding prompt. For example, the window def tag has an id 76 of 'a', and this id is maintained at 78 in the language dependent file for the particular prompt associated with that tag. The other tags have id's of 'b', 'c', and 'd', respectively, which are similarly maintained with the corresponding prompts 74.

The translation of the language dependent file 70 results in a corresponding file 80 having prompt strings for the particular language being supported. The translation step 102 merely involves a translator reading the language dependent file 70, and translating the prompts into the desired language, and creating a file 100 containing these translated prompts 102. In the specific example shown, the English language prompts 74 are translated into their equivalent German language prompts 104. Note that the id used to associate the prompts with the tags 72 are contained in the translated file 100 at 106, thus maintaining the link to the language independent file 68.

The language independent file 68, and the appropriate language dependent file 70, 100 (or any other language file for a supported language) then serve as inputs to the panel-formatter subsystem 108. The panel formatter interacts with the application program 110 which is running on the data processing system through an application programming interface, or API, at 112, where the program either presents data desired to be displayed to the user, or requests data from the user using prompts on the display. The panel-formatter subsystem 108 renders the screen display, including panels such as 88 of FIG. 5, as directed by the Application program 110, using the language independent file 68 and the appropriate language dependent file 70. Use of an alternate language dependent file such as 100, which supports the German language, would result in panel 120 being rendered on the display screen, when used in tandem with the common language independent file 68 of FIG. 4. Additional information supplied to the panel-formatter subsystem 108 are formats for various system variables 114. These values are used during the dynamic formatting operation of the panel-formatter, as will now be described.

The detailed operation of the panel-formatter subsystem 108 of FIG. 4 is shown in Table 1 below.

TABLE 1

```
PSEUDO-CODE executed by subsystem upon panel request by application:
Do for pass = 1 to 2
  do for all instructions
    if instruction is 'begin window definition' then do
      get width of title text
```

TABLE 1-continued

```
            add width of other title bar icons as needed
            set current max column width to calculated width
            set current Y position at O (upper-left O,O origin)
        end
        if instruction is 'create date field' then do
            retrieve prompt text from current language-dependent file
            calculate width of prompt text
            retrieve system date format
            create appropriate number of enterable elements
                for month, day, year, etc. plus appropriate
                separator static text fields
            arrange horizontally on panel according to system format
            if pass = 1 then do
                adjust alignment point to max of all current prompts
                set current max column width to alignment point plus max
                        width of all current primary controls
                        (including total width of all elements making up
                        this date entry field)
            end
            else (pass = 2) do
                position leftmost primary element at alignment point
                position prompt at left margin and current Y
                set current Y value to current Y value + datefield
                        height + datefield standard vertical spacing
            end
        end
        if instruction is 'create time field' then do
            retrieve prompt text from current language-dependent file
            calculate width of prompt text
            retrieve system time format
            create appropriate number of enterable elements
                for hours, minutes, etc. plus appropriate
                separator static text fields
            arrange horizontally on panel according to system format
            if pass = 1 then do
                adjust alignment point to max of all current prompts
                set current max column width to alignment point plus max
                        width of all current primary controls
                        (including total width of all elements making up
                        this time entry field)
            end
            else (pass = 2) do
                position leftmost primary element at alignment point
                position prompt at left margin and current Y
                set current Y value to current Y value + timefield
                        height + timefield standard vertical spacing
            end
        end
            if instruction is 'create currency field' then do
                retrieve prompt text from current language-dependent file
                calculate width of prompt text
                retrieve system currency format
                create appropriate number of enterable elements for
                    major/minor currency (dollars/cents) etc. plus
                    appropriate separator static text and prefix/suffix text
                arrange horizontally on panel according to system format
                if pass = 1 then do
                    adjust alignment point to max of all current prompts
                    set current max column width to alignment point plus max
                            width of all current primary controls
                            (including total width of all elements making up
                            this currency entry field)
                end
                else (pass = 2) do
                    position leftmost primary control at alignment point
                    position prompt at left margin and current Y
                    set current Y value to current Y value + currencyfield
                            height + currencyfield standard vertical spacing
                end
            end
            if instruction is 'end window definition' then do
                if pass = 2 then do
                    set window height = current Y value
                    set window width = current max column width
                end
            end
    end end
                (C) Copyright IBM Corporation 1991
```

As can be seen in this Table 1, the above process is executed upon an application program 110 of FIG. 4 requesting a panel to be rendered on an display device. The language independent, language dependent, and system formats are read by the formatter, which dynamically computes the location and size of the various fields to be displayed in the subscreen 84 of FIG. 5. It should be similarly noted that the above code allows for dynamic creation of language specific nomenclature, such as date, time, or currency presentation. For example, in FIG. 5 the English language presents the date as month/date/year at 90, whereas the German language presents the date as date-month-year at 122. The English panel displays time as an hour with values 1-12 and a date at 94, and further having an AM or PM, as appropriate, at 126. The German language panel 120, on the other hand, displays time using an hour nomenclature providing for hours 1-24 with no AM/PM designation, as shown at 124. Differences in currency presentation are also provided for at 98 and 128, where the English panel has a preceding currency indicator at 130, whereas the German version has a trailing currency indicator at 132. As can be seen from the above, this dynamic panel creation at application runtime supports language specific renditions independent from the application program. The person writing the application program has no cognizance of the resulting screen formats being used, and can code a single application program which will operate in a multilingual environment. The application program will operate, and present a consistent user interface, to an end user for any language having a language dependent file.

Another important feature of the present invention is the capability to annotate, or add comments to, the tags and prompts contained within the single source file. Returning to FIG. 4, a prompt note tag 62 is shown as a part of the prompt 60 of tag 56. The text 64 of this note tag is recognized by the compiler 31 during compilation, and is included in the language dependent file as a comment 134 associated with that particular prompt string 74. The particular embodiment for implementing this feature is shown below, in Table 2.

shouldn't be translated at all, as when the string is an acronym not having any dictionary meaning. A note could be provided to the translator to indicate the string should not be translated. This feature greatly reduces the number of iterations involved between the originating panel developers and translation centers by providing an improved method of conveying information within the file to be translated. Further, this information (text to be translated and accompanying notes) was initially derived from a single file containing all information pertaining to the panel to be displayed, with automatic generation of the language dependent text and associated notes. This automation further eliminates errors by ensuring that the appropriate information is attached to a given file to be translated.

As a further aid in the translation process, it has been found to be extremely useful to track and log changes made during the development of the initial panels. Such changes are common in a typical engineering/software development cycle, when a product progresses through various stages prior to the end product. For example, testing may discover errors in the program, the user interface may be objected to by a human-factors specialist, etc. Yet, in order to decrease development time of products (or 'time to market'), numerous activities must be done in parallel to reduce the overall time requirements. Therefore, a set of screen panels for a given application may need to be sent to a translation center before the final program code is completed. This is desirable in that translation centers can add significant time delays in translating a product, and by getting this phase going early on, prior to final code delivery, the overall development time can potentially be reduced. However, when the translation centers begin work on a pre-release version of code, the potential exists that what is desired in the final product may have different screen panels, requiring a different language dependent file for translation. There is no convenient method for

TABLE 2

PSEUDO-CODE Executed by compiler to extract notes
  Do for all input lines
    Get next line
    Determine which element type is being defined
    Locate definitions for each required text string for this element
        type
    Get the specified id in this line
    If a note is defined for a particular text string then do
      Build output line text with the id; the text string; "/* Note";
        then note text; then "*/"
    end
    else do
      Build the output line with the id; then the text string
    end
    Place the output line in 'Language dependent file' end
        (C) Copyright IBM Corporation 1991

The above feature is useful for aiding translators who will be translating the language dependent file 70 into another language dependent file 100 suitable for a particular language to be supported. For instance, some words in English may be used as either a noun or a verb, depending on the context of the word in a sentence. When the word is conveyed in the language dependent file, it may not have any context associated with it, and the translated word in the target language may have differing translations depending upon whether it is a noun or verb. By adding this annotation feature, such information can be easily conveyed to translators and translation houses. Other examples for using this feature could include instances where a particular text string indicating how a subsequent language dependent file differs from an earlier received version.

A solution to this problem is shown in FIG. 4, during the development process of creating the initial panels and language specific file associated therewith. A previous version of a language dependent file 136, which would be a file earlier sent to a translation center, for example, is compared at 138 with the current version of the language dependent file 70. A change log file 140 is generated as a result, and this change log file 140 can then be used by the translator centers and translators to minimize the amount of work required when a new language dependent file 70 is received. The following procedure of Table 3 details this operation.

TABLE 3

PSEUDO-CODE Executed by Comparison/Logger Program
   Prior to compile step:
      Rename language dependent file to another name save it.
   After compile:
      Read all lines from old version of language dependent file
      Store text strings such that they may be retrieved by their
         specified id value
      Read all lines from old version of language dependent file
      Store text strings such that they may be retrieved by their
         specified id value
      do for all strings in new file
         locate string by matching id in old-file group
         if string is different then do
            create log entry with date; time; 'Change'; id; old string;
               and new string
            flag old string as being referenced
         end
         if string id does not exist in old-file group then do
            create log entry with date; time; 'New'; id; new string
         end
      end
      do for all strings in old file
         if string has not been flagged as being referenced then do
            create log entry with date; time; 'Delete' id; old string
         end
      end
               (C) Copyright IBM Corporation 1991

The change log file created above could then be sent, along with the new language dependent file requiring translation, to the translation centers for expedient processing. This process reduces the amount of work in subsequent translations, and allows for early-level code to be sent for translation early in the development cycle. This results in a reduction in the overall development cycle for a product being developed with multilingual capabilities and markets.

While the invention has been particularly shown and described with reference to the preferred embodiment, it will be understood by those skilled in the art that various changes in form and detail may be made without departing from the spirit and scope of the invention.

I claim:

1. A system for facilitating, for each of a plurality of end-user applications, the translation of end-user interface screens in said end-user applications from a first to a second language, having at least one subscreen, of a multilingual compatible data processing system comprising:
   means for generating a plurality of first files substantially comprising language independent information each corresponding to a different one of said end-user applications;
   means for generating a plurality of second files substantially comprising language dependant information alterable with effect independent of execution of said end-user applications, each of said second files corresponding to one of said first files; and
   formatting means for dynamically formatting, for display during execution of said each of said end-user applications, at least one of said end-user interface screens in said second language using information from one of said first files and one of said second files, said formatting means further comprising conversion means for automatically converting said at least one subscreen to a language dependent format.

2. The system of claim 1 further comprising an application program interface to said end-user applications wherein said end-user applications are incognizant of said language dependent format.

3. The system of claim 1 wherein said language dependent format comprises a date field.

4. The system of claim 1 wherein said language dependent format comprises a time field.

5. The system of claim 1 wherein said language dependent format comprises a currency field.

6. The system of claim 1 wherein said first files and said second files are automatically generated from corresponding single source files using a data processing system program.

7. The system of claim 1 wherein said second files further comprise annotations for use by a translator.

8. The system of claim 1 wherein said second files further comprise change log information representing a history of corresponding changes made to said second files.

9. A method for generating user interface screens for each of a plurality of end-user applications from a single source file, having at least one subscreen, in a multilingual compatible data processing system comprising:
   compiling said source file to automatically segregate language independent and language dependent information into a first and second file, respectively;
   reading said first file substantially comprising language independent information;
   reading said second file substantially comprising language dependant information alterable with effect independent of execution of said end-user applications;
   dynamically formatting, during execution of said each of said end-user applications, at least one of said user interface screens using information from said first file and said second file and automatically converting said at least one subscreen to a language dependent format.

10. A method for generating of user interface screens for each of a plurality of end-user applications, having at least one subscreen, in a multilingual compatible data processing system comprising:
    executing an application program on said data processing system;
    generating a series of input and output commands, by said application program, to an application program interface of a user interface rendering program;
    reading a first file substantially comprising language dependant information alterable with effect independent of execution of said end-user applications and a second file substantially comprising language independent information by said rendering program upon receipt of at least one of said series of input and output commands; and
    dynamically formatting, during execution of said each of said end-user applications, at least one of said user interface screens, by said rendering program, using information from said first file and said second file and automatically converting said at least one subscreen to a language dependent format, wherein said application program is incognizant of said dependent language specific format.

11. An interim system for use by a translator to convert a user interface of an end-user application program in one language to a user interface in another language prior to execution of the program to display an end-user interface having at least one individual item of information defining an associated format and position, comprising means for generating a language independent file of data defining said associated format and position of said at least one individual item of information to be displayed in said end-user interface;

means for displaying a first language dependent screen of said at least one individual item in a first language without said data and with a corresponding referent to said data;

means for simultaneously displaying, with said displaying a first language dependent screen, a second language dependent screen in a second language without said data and with said corresponding referent, said first and second language dependent screens being alterable with effect independent of said end-user application program;

means for inputting into said second language dependent screen, adjacent said corresponding referent, said at least one individual item translated into said second language; and means for displaying during execution of said end-user application program in said end-user interface, in response to said language independent file and said inputting said at least one individual item translated into said second language, said displaying in said end-user interface being in said format and with position of said at least one individual item defined by said data.

12. The system of claim 11 wherein said means for simultaneously displaying includes means for displaying in said first language dependent screen adjacent said at least one individual item a comment for facilitating said inputting said at least one individual item translated into said second language; and wherein said means for displaying in said end-user interface includes means for inhibiting display of said comment.

13. The system of claim 11 further including means for displaying a modified said second language dependent screen; and change log means for recording differences between said second language dependent screen and said modified second language-dependent screen.

* * * * *